United States Patent
Vanderwees et al.

(10) Patent No.: US 7,191,858 B2
(45) Date of Patent: Mar. 20, 2007

(54) THERMAL MANAGEMENT SYSTEM

(75) Inventors: Doug Vanderwees, Mississiauga (CA); James S. Cotton, Burlington (CA)

(73) Assignee: Dana Canada Corporation (CA)

( * ) Notice: Subject to any disclaimer, the term of this patent is extended or adjusted under 35 U.S.C. 154(b) by 808 days.

(21) Appl. No.: 10/263,249

(22) Filed: Oct. 2, 2002

(65) Prior Publication Data
US 2004/0108148 A1 Jun. 10, 2004

(51) Int. Cl.
B60W 10/28 (2006.01)
(52) U.S. Cl. .................................... 180/65.3; 429/26
(58) Field of Classification Search ............. 180/65.3; 903/908, 944; 429/24, 26
See application file for complete search history.

(56) References Cited

U.S. PATENT DOCUMENTS

| | | | |
|---|---|---|---|
| 5,537,956 A | 7/1996 | Rennfeld et al. | |
| 6,186,254 B1 | 2/2001 | Mufford et al. | |
| 6,277,509 B1 * | 8/2001 | Wheeler | 429/17 |
| 6,331,366 B1 | 12/2001 | Van Dine et al. | |
| 6,360,835 B1 | 3/2002 | Skala | |
| 6,370,903 B1 | 4/2002 | Wlech | |
| 6,383,672 B1 | 5/2002 | Fujita | |
| 6,569,550 B2 * | 5/2003 | Khelifa | 429/13 |
| 6,673,482 B2 * | 1/2004 | Imazeki et al. | 429/26 |
| 6,740,432 B1 * | 5/2004 | Shimanuki et al. | 429/13 |
| 6,743,539 B2 * | 6/2004 | Clingerman et al. | 429/24 |
| 6,865,901 B2 * | 3/2005 | Horn et al. | 62/238.6 |
| 6,869,707 B2 * | 3/2005 | Edlund et al. | 429/19 |
| 6,887,608 B2 * | 5/2005 | Yamada | 429/26 |
| 6,902,838 B2 * | 6/2005 | Lee et al. | 429/26 |
| 6,942,938 B2 * | 9/2005 | Derflinger et al. | 429/20 |
| 6,955,861 B2 * | 10/2005 | Yoshizawa et al. | 429/26 |
| 6,964,820 B2 * | 11/2005 | Shimonosono et al. | 429/17 |
| 7,018,732 B2 * | 3/2006 | Cargnelli et al. | 429/13 |
| 7,052,790 B2 * | 5/2006 | Nakamura et al. | 429/26 |
| 2001/0050191 A1 | 12/2001 | Ogawa et al. | |
| 2002/0037447 A1 | 3/2002 | Imaseki et al. | |
| 2002/0076591 A1 | 6/2002 | Imaseki et al. | |

FOREIGN PATENT DOCUMENTS

FR 2 805 926 A 9/2001
JP 2002 075389 3/2002

* cited by examiner

Primary Examiner—Jeff Restifo
(74) Attorney, Agent, or Firm—Dykema Gossett PLLC

(57) ABSTRACT

A thermal management system has a high temperature heat transfer circuit and a low temperature heat transfer circuit for modulating the temperature of heat-generating components having different operating temperatures. The heat transfer circuits are in flow communication and are interdependent so that a single circulating pump can be used to pump a liquid heat transfer medium through both circuits. One of the heat transfer circuits comprises a continuous loop and the other heat transfer circuit comprises an open loop having a first end and a second end at which it is in flow communication with the first heat transfer circuit. Each heat transfer circuit is provided with a heat exchanger to modulate temperature of the heat transfer medium.

23 Claims, 3 Drawing Sheets

THERMAL MANAGEMENT SYSTEM

FIELD OF THE INVENTION

This invention relates to systems for modulating the temperature of at least two heat generating components having different operating temperatures.

BACKGROUND OF THE INVENTION

There are a number of known systems containing heat-generating components which operate at different temperatures. Exemplary of this type of system are fuel cell systems which, whether stationary or vehicular, contain a number of heat-generating components requiring temperature modulation. Some heat-generating components of a typical fuel cell system include the fuel cell, the fuel generation system, auxiliary fuel cell temperature conditioners, and the traction motor in vehicle applications. Types of fuel generation systems include sodium borohydride systems, electrolyzers and fuel reformer systems. Auxiliary fuel cell temperature conditioners include humidity and temperature controls for the anode and cathode streams entering the fuel cell stack, electronics or power electronics modules, condensers, charge air coolers for cooling hot air, fuel storage systems and battery conditioners. Some of these components have different operating temperatures and therefore have different temperature modulation requirements.

In order to meet these different requirements, fuel cell systems have typically been provided with two or more independent heat transfer circuits. Each circuit has its own pumping means and heat exchange means for regulating the coolant temperature, and may have a heat transfer fluid which differs from that of the other heat transfer circuits. An example of such a fuel cell system is described in U.S. Pat. No. 5,537,956 (Rennfeld et al.), which relates to an arrangement for cooling vehicle components by use of at least two separate cooling circuits. In the Rennfeld et al. system, each circuit has its own pump and radiator/fan, with the first circuit including the fuel cell unit, and the second circuit including the electric drive motor and power controller. The two circuits are in heat exchange communication, however there is no flow communication between the two circuits.

U.S. Pat. No. 6,370,903 (Wiech) describes a heat pump type air conditioning and heating system for use in fuel cell-powered vehicles. The systems described by Wiech have two separate coolant circuits and a refrigeration circuit. The coolant circuits operate on separate pumps and are cooled by separate radiators, and may preferably be in heat exchange communication. However, there is no flow communication between the various heating and/or cooling circuits.

U.S. Pat. No. 6,360,835 to Skala describes a fuel cell powered electric vehicle having high and low temperature heat transfer circuits. The high temperature heat transfer circuit includes a heat generating fuel processor, an endothermic device, and a first circulating pump. The low temperature heat transfer circuit includes the fuel cell, traction motor, power electronics, radiator, and a second pump. The same heat transfer fluid is used in both the high and low temperature circuits. There is some flow communication between the two circuits through a pair of conduits, with the flow through each conduit being controlled by a valve.

It will be appreciated that the provision of multiple heat transfer circuits having separate plumbing, pumps and temperature modulation means greatly increases the cost, complexity and weight of a fuel cell power plant or other operating system. Thus, there is an unsatisfied need for simpler, more efficient thermal management systems.

SUMMARY OF THE INVENTION

In one aspect, the present invention provides a thermal management system for modulating the temperature of a first heat-generating component operating at a first temperature and a second heat-generating component operating at a second temperature, the first and second temperatures being different, the system comprising: (a) a first heat transfer circuit for circulating a heat transfer medium in heat exchange relation with the first heat-generating component, the first heat transfer circuit including a first heat exchanger for modulating the temperature of the heat transfer medium circulating in the first heat transfer circuit; (b) a second heat transfer circuit for circulating the heat transfer medium in heat exchange relation with the second heat-generating component, the second heat transfer circuit including a second heat exchanger for modulating the temperature of the heat transfer medium circulating in the second heat transfer circuit, the first and second heat transfer circuits being in flow communication with one another; (c) a circulation pump for circulating the heat transfer medium through both the first and second heat transfer circuits; wherein one of the first heat transfer circuit and the second heat transfer circuit forms a continuous loop, and the other of the first heat transfer circuit and the second heat transfer circuit having a first end and a second end at which the circuits are in flow communication.

BRIEF DESCRIPTION OF THE DRAWINGS

Preferred embodiments of the invention will now be described, byway of example only, with reference to the accompanying drawings, in which.

DETAILED DESCRIPTION OF PREFERRED EMBODIMENTS

Figure 1:
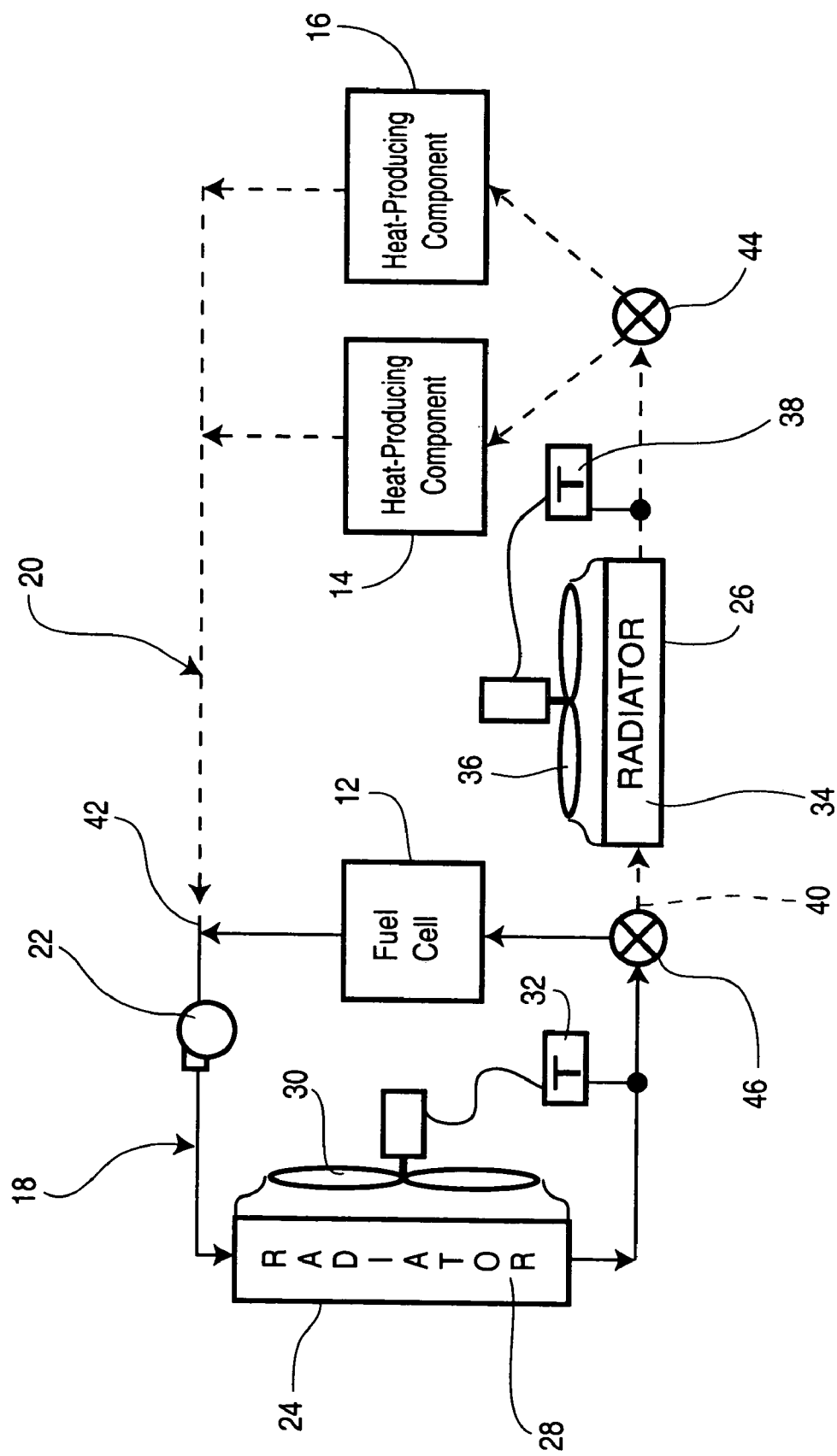
FIG. 1 is a schematic view of a first preferred thermal management system according to the invention.

Preferred thermal management systems according to the present invention are now described below with reference to the drawings, in which like reference numerals are used to refer to similar parts of the various embodiments of the system. Although the preferred embodiments are described in connection with fuel cell systems, it will be appreciated that the present invention can be adapted to other applications, for example for thermal management of hybrid vehicle operating systems, internal combustion engines or electronics.

FIG. 1 illustrates a first preferred thermal management system 10 for modulating the temperature of a number of components of a fuel cell power plant. It will be appreciated that the drawings do not illustrate all components of the fuel cell power plant, but only include those components which are necessary for an understanding of the present invention. The components of the fuel cell power plant illustrated in FIG. 1 are the fuel cell 12 and a pair of components 14 and 16, all of which are exothermic under most operating conditions. Components 14 and 16, generally referred to herein as "heat-producing components", are either fuel generation modules or auxiliary fuel cell temperature conditioners, as defined above. The specific identities of components 14 and 16 is not necessary to an understanding of the present invention, although in the specific examples described below, components 14 and 16 are auxiliary fuel cell temperature conditioners. While component 12 is referred to herein as a "fuel cell", it will be appreciated that this component could instead comprise a fuel cell heat exchanger.

Thermal management system 10 comprises two interconnected heat transfer circuits, a first heat transfer circuit 18 for circulating a liquid heat transfer medium in heat exchange relation with the fuel cell 12, and a second heat transfer circuit 20 for circulating the same liquid heat transfer medium in heat exchange relation with one or both of the heat-producing components 14 and 16. It will be appreciated that second heat transfer circuit 20 may include only one heat-producing component or may also include heat-producing components in addition to components 14 and 16. It will also be appreciated that first heat transfer circuit 18 could include one or more heat-producing components in addition to fuel cell 12 which, as mentioned above, may comprise a fuel cell heat exchanger.

The first heat transfer circuit 18 also includes a circulation pump 22, which may preferably be a single speed, multi-speed or variable speed pump, for circulating the heat transfer medium through both the first and second heat transfer circuits. More preferably, the pump 22 is a multi-speed or variable speed pump and, in the preferred embodiment shown in FIG. 1, pump 22 is located in the first heat transfer circuit 18. However, it will be appreciated that pump 22 could preferably be located in the second heat transfer circuit 20.

For modulating the temperature of the heat transfer medium circulating in the heat transfer circuits, a first heat exchanger 24 and a second heat exchanger 26 are provided in the first heat transfer circuit 18 and second heat transfer circuit 20, respectively. The heat exchangers 24, 26 are preferably provided with means for accurately controlling the temperature of the heat transfer medium.

The particular types of heat exchangers used in the systems according to the present invention are not particularly limited. For example, heat exchangers 24, 26 may preferably comprise liquid-to-liquid heat exchangers in combination with a controlled bypass as a means for controlling the temperature of the heat transfer medium. The use of such a system is particularly preferred in applications where it is desirable to recapture some of the heat generated by the fuel cell to an auxiliary fluid medium. In the alternative, heat exchangers 24, 26 could preferably comprise liquid-to-liquid heat exchangers which are not provided with a controlled bypass. Rather, the flow of the auxiliary fluid medium could be varied to provide temperature control in the heat transfer medium. The use of these types of systems permit the fuel cell to be brought to its operating temperature relatively quickly.

In the preferred system 10 shown in FIG. 1, the first heat exchanger 24 comprises a radiator 28 having a thermostatically controlled fan 30 as a means to control the temperature of the heat transfer medium, with the operation of fan 30 being controlled by a temperature controller 32. Similarly, the second heat exchanger 26 comprises a radiator 34, a thermostatically controlled fan 36 and a temperature controller 38. The inventors have found that the use of radiator/fan units provides rapid temperature control. In addition, where circulation pump 22 is a variable speed pump, it may also be used as a means for controlling the temperature of the heat transfer medium, and more preferably to control the fuel cell temperature or the temperature differential across the stack.

For greater certainty in distinguishing the first and second heat transfer circuits 18 and 20, the conduits comprising the first heat transfer circuit 18 are shown in solid lines, whereas the conduits comprising the second heat transfer circuit 20 are shown in dashed lines. It can be seen that the first heat transfer circuit 18 forms a continuous loop, with heat being added to the heat transfer medium by fuel cell 12 and being partially removed from the heat transfer medium by heat exchanger 24. The second heat transfer circuit 20 does not form a closed loop, and has a first end 40 and a second end 42 at which the second heat transfer circuit 20 is in flow communication with the first heat transfer circuit 18.

It will be appreciated that either one of the first heat transfer circuit 18 or the second heat transfer circuit 20 may be a continuous loop, so long as the thermal management system 10 forms a plurality of interdependent heat transfer circuits which are controllable by a single circulation pump. In the preferred thermal management system 10 according to the first preferred embodiment, the heat transfer circuits 18 and 20 are interdependent in that the second heat transfer circuit 20 is an open circuit which cannot be operated independently of the first heat transfer circuit 18.

In the first preferred thermal management system 10, the first heat transfer circuit 18 comprises a high temperature circuit in which the heat transfer medium circulating in the first heat transfer circuit 18 is at an equal or higher temperature than the heat transfer medium circulating in the second heat transfer circuit 20. The temperature of the heat transfer medium circulating in heat transfer circuits 18 and 20 is not particularly limited, and may preferably be within the range of from about 40° C. to about 200° C. For the purpose of illustration only, the discussion of preferred embodiments refers to thermal management systems in which the temperature of the heat transfer medium is generally within the temperature range of from about 60° C. to about 80° C. However, the thermal management systems according to the present invention are not limited to operation within this narrow temperature range.

In thermal management system 10 illustrated in FIG. 1, the first heat exchanger 24 controls the temperature of the heat transfer medium in the first heat transfer circuit 18 such that the temperature of heat transfer medium is about 70° C. when it comes into heat exchange contact with fuel cell 12, whereas the second heat exchanger 26 controls the temperature in the second heat transfer circuit 20 such that the temperature of the heat transfer medium is about 60° C. when it comes into heat exchange contact with the heat-producing component 14. The temperature of the heat transfer medium immediately downstream of the fuel cell 12 is about 80° C., whereas the temperature of the heat transfer medium immediately downstream of component 14 is about 65° C. The high and low temperature streams mix at point 42, effectively lowering the temperature of the heat transfer medium in the first heat transfer circuit 18 and reducing the required size of the first heat exchanger 24. Preferably, the first and second heat transfer circuits 18 and 20 are balanced such that the first and second heat exchangers 24 and 26 are of similar size and heat exchange capacity.

As illustrated by the directions of the arrows shown in the second heat transfer circuit 20, heat transfer medium flows from the first end 40 of second heat transfer circuit 20 to the second end, passing through second heat exchanger 26 and through one or both of the heat-producing components 14 and 16. The means illustrated in FIG. 1 for directing flow to components 14 and 16 comprises valve 44, which may preferably comprise an active control valve or a multi-position diverter valve. However, it will be appreciated that other means for directing flow to modules 14 and 16 may be preferred, depending on the system requirements. Such alternate means include throttle valves and passive orifice plates. It may also be possible to control the flow of heat transfer medium by strategic placement of the fuel cell components within the system.

It can be seen from FIG. 1 that a controlled portion of the heat transfer medium circulating in the first heat transfer circuit 18 enters the first end 40 of the second heat transfer circuit 20. The flow of heat transfer medium entering second heat transfer circuit 20 may preferably be controlled by a valve and/or calibrated orifices, more preferably an active control valve, multi-position diverter valve, throttle valve or a passive orifice plate. In the preferred embodiment shown in FIG. 1, the flow of heat transfer medium entering the first end 40 of the second heat transfer circuit 20 is controlled by a multi-position, three-way valve 46. It will also be appreciated that all the heat transfer medium flowing through the second heat transfer circuit 20 will flow through the second end 42 of the second heat transfer circuit 20 and into the first heat transfer circuit 18.

Thus, a portion of the flow through first heat transfer circuit 18 is diverted into the first end 40 of second heat transfer circuit 20, and re-enters the first heat transfer circuit 18 through the second end 42 of the second heat transfer circuit 20. The heat transfer medium entering the first end 40 of second heat transfer circuit 20 is initially at a temperature of about 70° C., and is cooled to about 60° C. before passing through heat-producing components 14 and/or 16. The heat transfer medium exiting components 14 and 16 and flowing to the second end 42 of the second heat transfer circuit 20 is at a temperature of about 65° C. This heat transfer medium at about 65° C. mixes with the heat transfer medium exiting fuel cell 12 at about 80° C., with the temperature of the heat transfer medium after mixing being about 70 to 75° C. This heat transfer medium is then cooled to about 70° C. by the first heat exchanger 24. In both the first and second heat transfer circuits 18, 20, the amount of heat removed by heat exchangers 24 and 26 is thermostatically controlled by temperature controllers 32 and 38, which are positioned immediately upstream of the heat-generating components 12, 14 and 16. Thus, the critical operating temperatures of the components 12, 14 and 16 will be precisely controlled.

Figure 2:
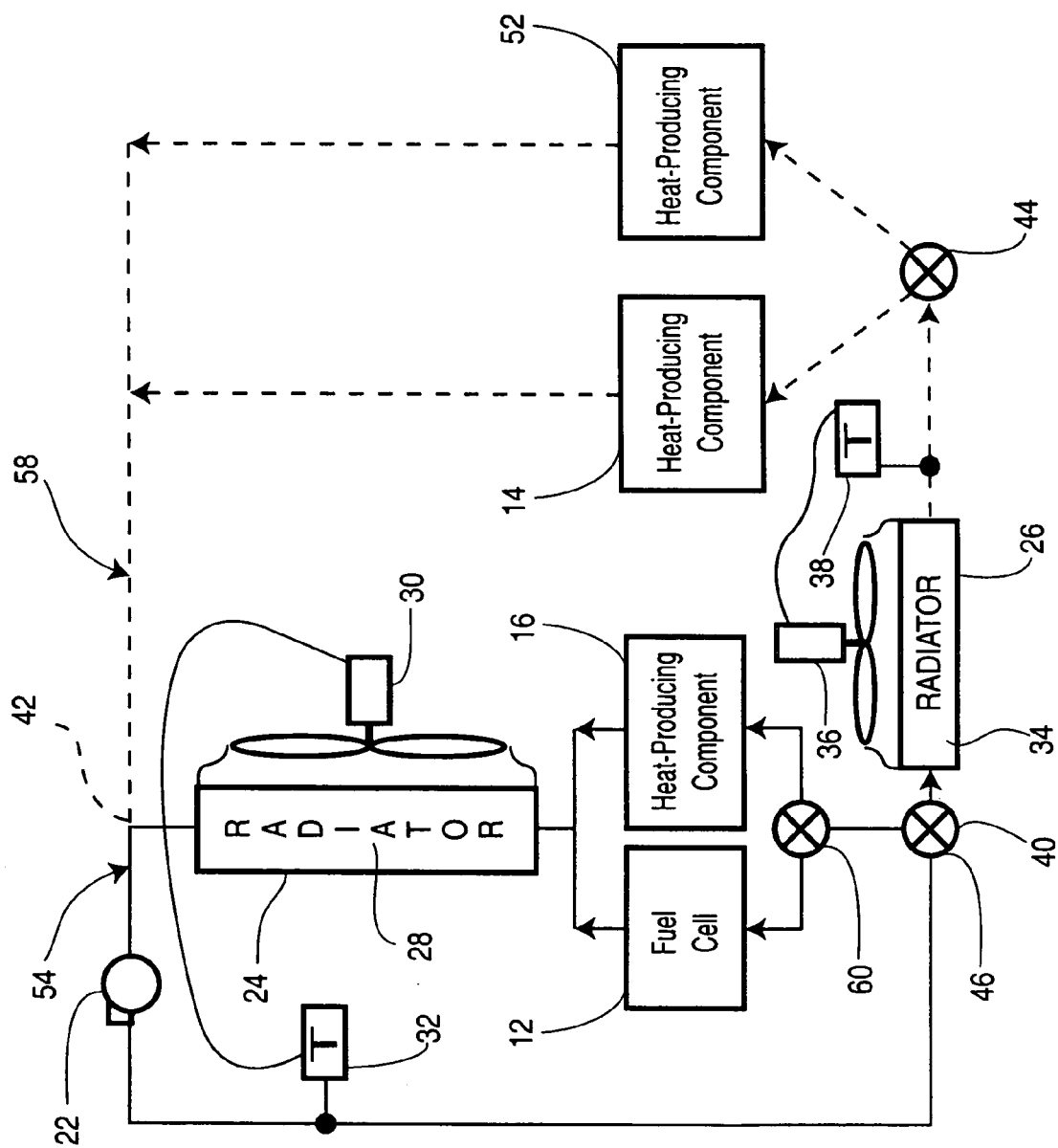
FIG. 2 is a schematic view of a second preferred thermal management system according to the present invention.

A second preferred thermal management system 50 according to the invention is illustrated in FIG. 2. As in the first preferred system 10, the thermal management system 50 includes a fuel cell 12 and heat-producing components 14 and 16. In addition, the second preferred thermal management system 50 also modulates temperature of an additional heat-producing component 52 which may comprise either an auxiliary fuel cell temperature conditioner or a fuel generation system. In the specific examples discussed below, component 52 is an auxiliary fuel cell temperature conditioner. The thermal management system 50 comprises a first heat transfer circuit 54 having a first heat exchanger 24 for modulating the temperature of the fuel cell 12 and the heat-producing component 16, and also includes a second heat transfer circuit 58 having a second heat exchanger 26 for modulating the temperature of the heat-producing components 14 and 52. As in FIG. 1, the conduits making up the first heat transfer circuit 54 are shown in solid lines, and those comprising the second heat transfer circuit 58 are shown in dashed lines.

As in the first preferred thermal management system 10, the first heat exchanger 24 comprises a radiator 28, a thermostatically controlled fan 30 and a temperature controller 32, while the second heat exchanger 26 comprises a radiator 34, a thermostatically controlled fan 36 and a temperature controller 38.

A single pump 22 is provided to circulate the heat transfer medium through thermal management system 50. As in the first preferred system 10, the first heat transfer circuit 54 forms a continuous loop while the second heat transfer circuit 58 has a first end 40 through which it receives heat transfer medium from the first circuit 54, and a second end 42 at which the heat transfer medium circulating through the second heat transfer circuit 58 is mixed with heat transfer medium flowing through the first heat transfer circuit 54.

One difference between thermal management system 50 and thermal management system 10 is in the arrangement of the heat-generating components. In thermal management system 50, the second heat transfer circuit 58 removes heat from components 14 and 52, with flow to components 14 and 52 being controlled by a valve or calibrated orifices 44. Also, the first heat transfer circuit 54 includes the fuel cell 12 and the heat-producing component 16, with flow to these components being controlled by a valve and/or calibrated orifices 60.

The first heat transfer circuit 54 of system 50 is the high temperature circuit, with the heat transfer medium entering the fuel cell 12 and/or component 16 being at about 70° C., and the temperature of the heat transfer medium exiting fuel cell being about 80° C. In the second heat transfer circuit 58, which is the low temperature circuit, the temperature of heat transfer medium entering component 14 or component 52 is about 60° C., and the temperature of the heat transfer medium exiting the component 14 is about 65° C.

Another difference between thermal management system 50 and thermal management system 10 is that the heat exchanger 24 of the first heat transfer circuit 54 is positioned downstream of the fuel cell 12 and component 16 and upstream of the point 42 at which mixing of the heat transfer medium in the first and second circuits 54, 58 takes place. Nevertheless, accurate temperature control in this embodiment is possible due to the fact that the temperature controller 32 is positioned downstream of the mixing point 42 and immediately upstream of the fuel cell 12 and component 16.

The position of second heat exchanger 26 relative to the components 14 and 52 in the second heat transfer circuit 58 are the same as in the first thermal management system 10.

Figure 3:
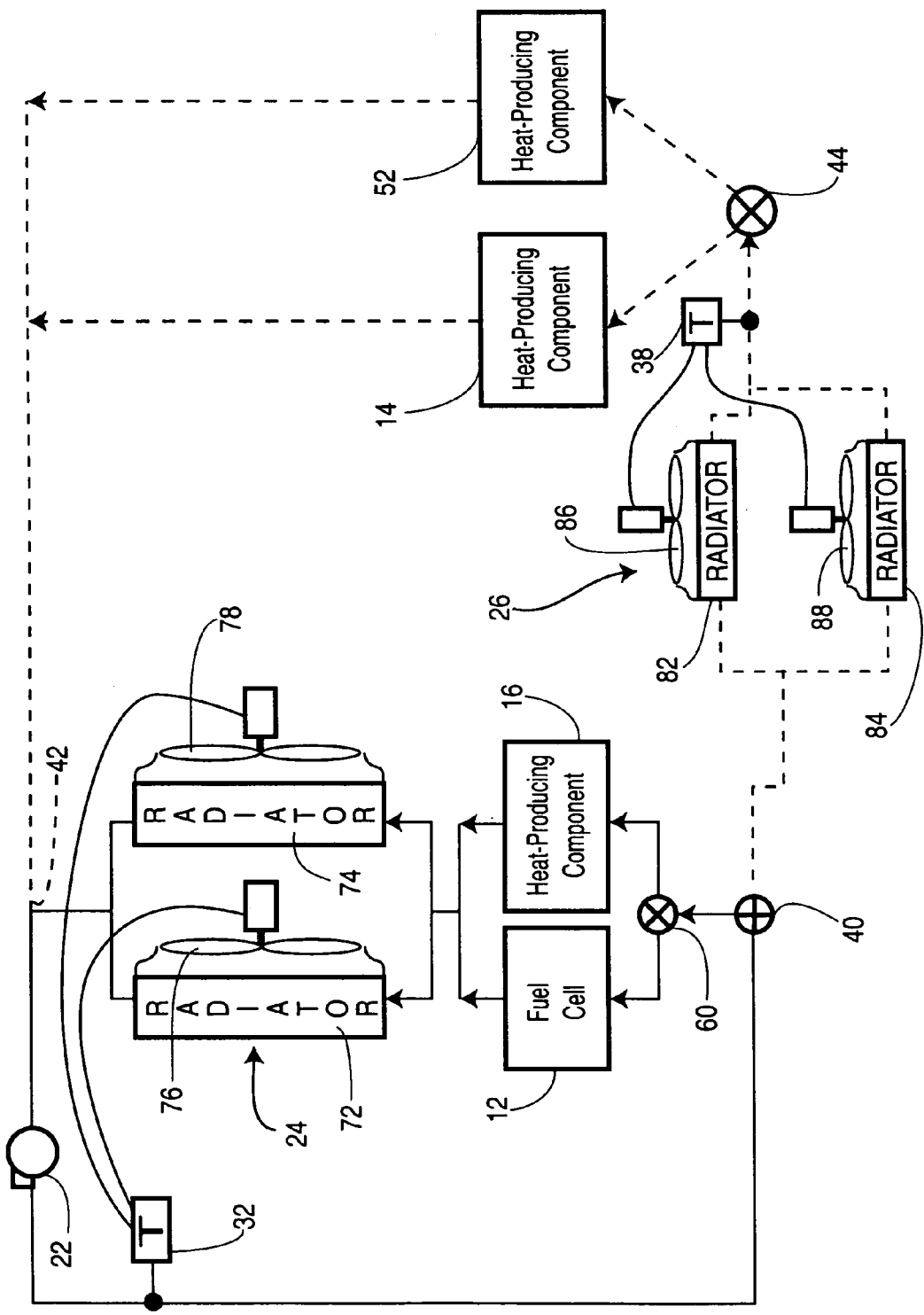
FIG. 3 is a schematic view of a third preferred thermal management system according to the present invention.

FIG. 3 illustrates a third preferred thermal management system 70 according to the present invention. Thermal management system 70 can be regarded as a variant of the second preferred thermal management system 50 in which each of the heat exchangers comprises a plurality of radiators arranged in parallel to one another. The first heat exchanger 24 comprises a pair of radiators 72 and 74 provided with thermostatically controlled fans 76 and 78, respectively. The operation of fans 76 and 78 is controlled by temperature controller 32. The radiators 72, 74 each have lower heat exchange capacity than the larger radiators 28 used in the first and second preferred embodiments of the invention. The inventors have found that the replacement of one large radiator 24 by a pair of smaller radiators 72, 74 arranged in parallel greatly reduces the pumping requirements, thereby enhancing the efficiency of the thermal management system.

Similarly, the second heat exchanger 26 of the third preferred system 70 preferably comprises a pair of radiators 82, 84 arranged in parallel, the radiators 82, 84 being provided with thermostatically controlled fans 86 and 88, respectively. The temperature controller 38 controls the operation of both fans 86 and 88.

Although the invention has been described in connection with certain preferred embodiment, it is not to be limited thereto. Rather, the invention is intended to include all embodiments which may fall within the scope of the following claims.

What is claimed is:

1. A thermal management system for modulating the temperature of a first heat-generating component operating at a first temperature and a second heat-generating component operating at a second temperature, the first and second temperatures being different, the system comprising:
   (a) a first heat transfer circuit for circulating a heat transfer medium in heat exchange relation with the first heat-generating component, the first heat transfer circuit including a first heat exchanger for modulating the temperature of the heat transfer medium circulating in the first heat transfer circuit;
   (b) a second heat transfer circuit for circulating the heat transfer medium in heat exchange relation with the second heat-generating component, the second heat transfer circuit including a second heat exchanger for modulating the temperature of the heat transfer medium circulating in the second heat transfer circuit, the first and second heat transfer circuits being in flow communication with one another;
   (c) a circulation pump for circulating the heat transfer medium through both the first and second heat transfer circuits;
   wherein the first heat transfer circuit forms a continuous loop, and the second heat transfer circuit has a first end and a second end at which the circuits are in flow communication; and
   wherein the first end of the second heat transfer circuit is in flow communication with the first heat transfer circuit at a point which is upstream relative to the first heat-generating component, and wherein the second end of the second heat transfer circuit is in flow communication with the first heat transfer circuit at a point which is downstream relative to the first heat-generating component.

2. The thermal management system according to claim 1, wherein the first heat-generating component is a fuel cell or a fuel cell heat exchanger.

3. The thermal management system according to claim 1, wherein the second heat-generating component comprises one of a fuel generation system and an auxiliary fuel cell temperature conditioner.

4. The thermal management system according to claim 1, wherein the first temperature is greater than the second temperature, such that the heat transfer medium circulating in the first heat transfer circuit is at an equal or higher average temperature than the heat transfer medium circulating in the second heat transfer circuit.

5. The thermal management system according to claim 1, wherein the heat transfer medium flows from the first end to the second end of the second heat transfer circuit.

6. The thermal management system according to claim 5, wherein a portion of the heat transfer medium circulating in the first heat transfer circuit enters the first end of the second heat transfer circuit.

7. The thermal management system according to claim 6, wherein flow of the heat transfer medium from the first heat transfer circuit into the first end of the second heat transfer circuit is controlled by flow control means comprises one of a valve and a plurality of calibrated orifices.

8. The thermal management system according to claim 5, wherein the heat transfer medium in the second heat transfer circuit flows from the second end of the second heat transfer circuit into the first heat transfer circuit.

9. The thermal management system according to claim 1, wherein each heat exchanger comprises one or more temperature-controlled modulating means, each of the temperature-controlled modulating means comprises one of a fan-cooled radiator and a liquid-to-liquid heat exchanger.

10. The thermal management system according to claim 9, wherein the one or more temperature-controlled modulating means comprise a plurality of fan-cooled radiators arranged in parallel.

11. The thermal management system according to claim 9, wherein each of the temperature-controlled modulating means comprises a radiator provided with a thermostatically-controlled fan.

12. The thermal management system according to claim 1, wherein the second heat exchanger is upstream of the second heat-generating component.

13. The thermal management system according to claim 1, wherein the first heat transfer circuit further comprises an additional component comprises one of a fuel generation module and an auxiliary fuel cell temperature conditioner.

14. The thermal management system according to claim 13, wherein the additional component is arranged in parallel with the first heat-generating component, with a flow regulating means being provided upstream of the first heat-generating component and the additional component, the flow regulating means comprises one of a valve and a plurality of calibrated orifices.

15. The thermal management system according to claim 1, wherein the first heat exchanger is downstream of the first heat-generating component and the second heat exchanger is upstream of the second heat-generating component.

16. The thermal management system according to claim 15, wherein:
   the first heat exchanger is downstream of the first heat-generating component;
   the second end of the second heat transfer circuit is downstream of the first heat generating component and downstream of the first heat exchanger; and
   the heat transfer medium in the second heat transfer circuit flows into the first heat transfer circuit at said second end.

17. The thermal management system according to claim 16, wherein:
   the first and second heat exchangers each comprise a radiator having a thermostatically-controlled fan; and
   the thermal management system further comprises a first temperature controller and a second temperature controller for controlling operation of the thermostatically-controlled fans of the respective first and second heat exchangers.

18. The thermal management system according to claim 17, wherein the first temperature controller is located downstream of the first heat exchanger and upstream of the first heat-generating component and the second temperature controller is located downstream of the second heat exchanger and upstream of the second heat-generating component.

19. The thermal management system according to claim 18, wherein:
   a portion of the heat transfer medium circulating in the first heat transfer circuit enters the first end of the second heat transfer circuit;

the second heat exchanger is located immediately downstream of said first end; and the second temperature controller is located immediately downstream of said second heat exchanger.

20. The thermal management system according to claim 18, wherein the first temperature controller is located downstream of the second end of the second heat transfer circuit.

21. The thermal management system according to claim 20, wherein the first temperature controller is located downstream of the circulation pump.

22. The thermal management system according to claim 1, wherein the first heat exchanger cools the heat transfer medium circulating in said first heat transfer circuit to said first temperature at which said first heat-generating component operates; and the second heat exchanger cools the heat transfer medium circulating in said second heat transfer circuit to said second temperature at which said second heat-generating component operates.

23. The thermal management system according to claim 1, wherein the first and second heat exchangers are of similar size and heat exchange capacity so as to balance the first and second heat transfer circuits.

* * * * *